Sept. 22, 1953        W. E. ELLIS        2,653,032
TRAILER STEERING HITCH
Filed Dec. 27, 1949
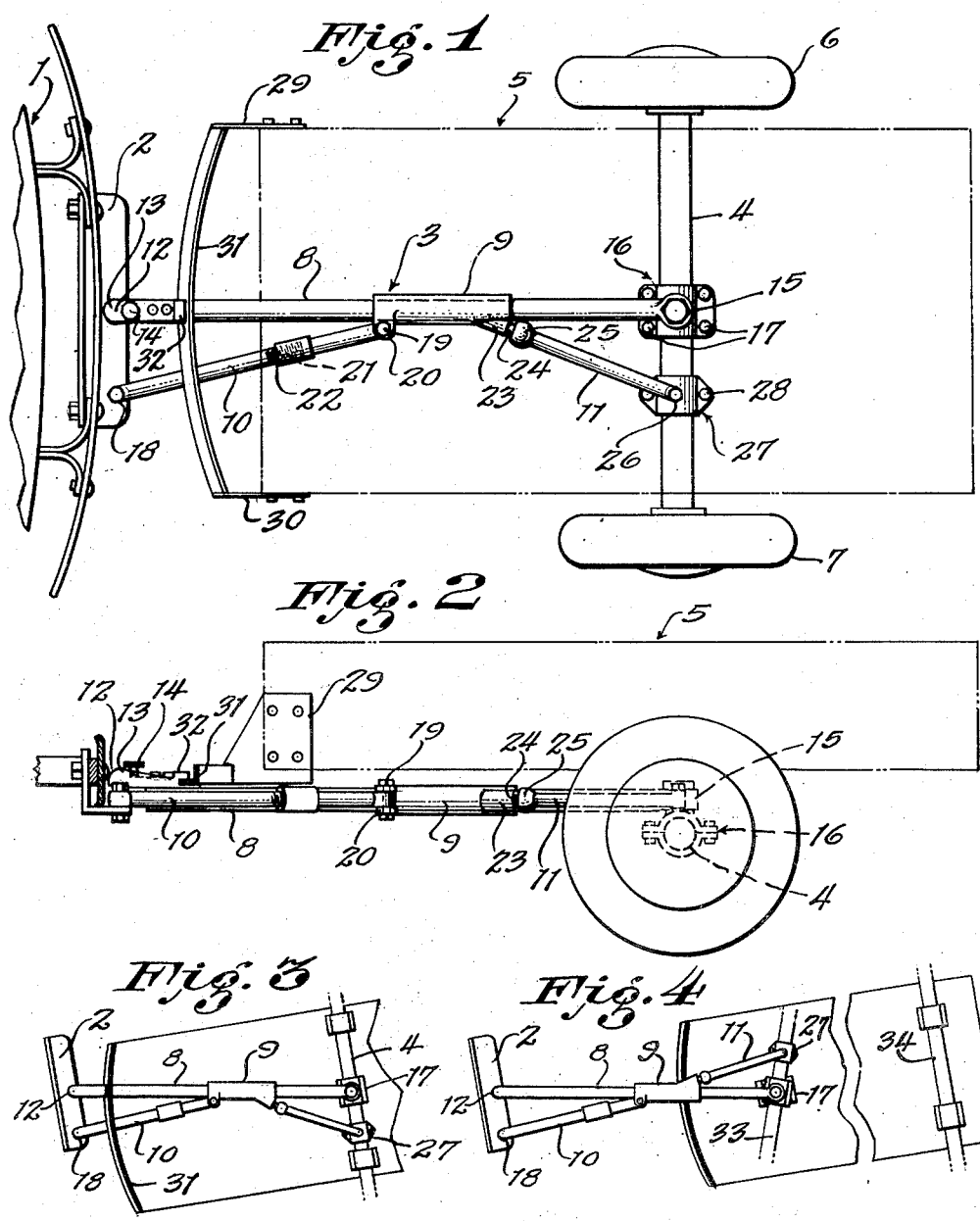
INVENTOR,
WALTER E. ELLIS;
By
ATTORNEY.

Patented Sept. 22, 1953

2,653,032

UNITED STATES PATENT OFFICE 2,653,032

TRAILER STEERING HITCH

Walter E. Ellis, Los Angeles, Calif.

Application December 27, 1949, Serial No. 135,137

2 Claims. (Cl. 280—33.5)

1

The present invention relates to trailer hitches of the type which may connect a self-propelled vehicle with a trailer for the purpose of pulling and guiding movement of said trailer.

It is general practice to attach a trailer to the rear of a car when the haul is relatively short and the loading is comparatively light. The present invention is adaptable to trailers of all types.

Experience teaches that the average hitch will not permit the driver of a vehicle to back the vehicle and the trailer so as to park the same in a given space in an easy manner.

The present invention has for one of its objects the provision of a hitch which permits the driver to accurately back the trailer into a space under complete guidance of the driver.

My invention may take two forms, one wherein the front wheels of the trailer may be steered in accordance with the front wheel position of the propelled vehicle, or one wherein the direction of movement of the rear of both the trailer and the self-propelled vehicle is the same.

Further objects include the provision of a trailer hitch which is economical in cost of manufacture, easily installed, not complicated, of few parts, and generally superior to trailer hitches now known to the inventor.

With the above-mentioned and other objects in view, the invention consists in the novel and useful provision, formation, construction, association, and relative arrangement of parts, members, and features, all as shown in one embodiment in the accompanying drawings described generally and more particularly pointed out in the claims.

In the drawings:

Figure 1 is a fragmentary, top plan view of the hitch as applied between a two wheel trailer and a self-propelled vehicle;

Figure 2 is a fragmentary, partially sectional, side elevation of the hitch shown in Figure 1;

Figure 3 is a fragmentary plan view showing the action of the hitch while backing a two wheel trailer of the type shown in Figure 1; and, Figure 4 is a fragmentary plan view of a modified form of hitch for a four wheeled trailer.

Referring now with particularity to the drawings, I have illustrated at 1 a fragment of a self-propelled vehicle carrying an angle iron member 2 at the rear thereof to which angle iron member 2 a hitch 3 is secured and which hitch 3, in turn, is secured to an axle housing 4 of a trailer 5 of the two-wheeled type. Trailers of the two-wheeled type usually comprise a body of some character having a transverse axle carrying wheels as shown at 6 and 7. Usually the front of the trailer is secured in some manner to the vehicle 1 to support the front end thereof when the trailer is carrying a load. It is ordinary practice to connect the front end of the trailer to a swivel bolt associated with the body of the vehicle 1. In the present instance, the trailer hitch 3 includes a draw bar 8, a sleeve 9 axially slidable on said draw bar, and a pair of arms 10 and 11 movably secured to the sleeve 9. The draw bar 8 is secured at one end to the angle iron member 2 and at its opposite end to the axle housing 4. Thus referring to Figure 2, the angle iron member 2 is provided with a bolt, the upper end of which is provided with a ball-like or hemispherical member, not shown but usual in practice, and the end 12 of the draw bar 8 carries a hitch or cap 13 formed with a spherical socket portion which receives and encloses the hemispherical member aforesaid. The hitch or cap 13 is fastened to the draw bar 8 and is made adjustable by the usual screw means 14. The opposite end 15 of the draw bar 8 has an enlarged head formed with a transverse bore and a pivot-type bolt is passsed through the bore and secured to a clamp 16. This clamp is conventional in form and consists of two half rounded members provided with diametric lugs or ears which lugs or ears are secured together and in clamped relationship about the axle housing by bolts 17. Thus, it will be seen that one end of the draw bar is pivoted to the axle housing while the opposite end is swivelled to the member 2. The swivel connection at 12 takes care of any unevenness in the road as well as vehicle sway, as is obvious. The arm 10 has one end 18 pivotally connected to the member 2, while its opposite end is swingingly mounted or pivoted at 19 to one end of the sleeve 9. The sleeve is provided with a projecting lug 20 for this purpose. Furthermore the arm 10 is adjustable as to length by forming said arm in two parts, one end of one part being internally threaded at 21, while the second part of the arm is externally screw threaded at 22. The sleeve 9 is provided with an offset at 23 from which projects a member 24 having a ball or hemispherical head. The arm 11 is formed at one end with a socket 25 to receive said ball 24, while the opposite end 26 of the arm is pivoted to a clamp 27 which clamp is secured about the axle housing 4. This clamp takes the same form as the clamp 16 for the draw bar, that is to say, comprises two half rounded members provided with diametric lugs, the lugs of which are secured together by means of bolts as shown at 28.

The forward end of the trailer body is provided with two side brackets 29 and 30, and extending between the side brackets is an arcuate load support member 31. This load support member is of angle iron cross-section. The center for said arc is the pivot pin connection between the draw bar and the axle housing. The draw bar 8 carries a lug 32 which rides upon one leg of the member 31 and in this manner acts to support the forward end of the trailer.

In the form of the invention shown in Figure 4, the arm 11 has been transferred from the position shown in Figure 1 to a position on the opposite side of the draw bar 8. This is the only change and all remaining parts are the same.

The operation, uses and advantages of the invention just described are as follows:

Assuming the two wheeled type of trailer of Figure 1, the trailer hitch is adjusted so that the axle housing 4 is parallel with the rear axle of the vehicle 1. The draw bar and its associated arms will then assume the position shown in Figure 1. Any adjustment that may be required is accomplished by rotating the adjustable arm 10, that is, by adjusting the threaded relationship at 21 and 22. This adjustment, of course, is effected prior to securing the arm 10 to the member 2. If the driver of the vehicle 1 desires to back the trailer into a given location, as shown in Figure 3, such a backing will move the sleeve 9 on the draw bar 8 and cause the arm 11 to bodily turn the trailer, for the reason that the axle housing 4 is fixedly secured to the body of the trailer and is not capable of any independent movement. If, for instance, the rear of the vehicle 1 shown in Figure 3 was at a different angle, the angularity assumed by the axle housing 4 would be at the same angle, that is to say, the member 2 and the axle would be parallel.

In the case of a four wheeled type of trailer, I have for the purpose of simplicity shown the axle 33 as movable, the said trailer having a fixed rear axle 34. Some trailers use a movable axle while others of the four wheeled type may incorporate a steering mechanism which includes a steering arm for controlling movement of a steering cross rod which connects with the wheels. When a construction of this type is utilized, the steering arm is pivoted to the arm 11, while the draw bar is pivoted to the axle.

However, assuming the construction shown in Figure 4 for convenience of illustration and description, the arm 11 is positioned on the side opposite the arm 10, in other words an X form. In this position, when the rear of the vehicle is backed in the direction shown in Figure 4, the rear of the trailer will be backed as shown, in other words, the rear axle 34 is substantially parallel to the rear axle of the draft vehicle while the front axle 33 of the trailer will be turned at an angle.

It is evident from Figures 3 and 4 that the vehicle 1 at all times controls the direction of movement of either a two wheel or four wheel trailer in accordance with the position of the vehicle 1. The angularity assumed by the arms 10 and 11 relative to the draw bar 8 is easily determined as the pivot points for the draw bar and arms must be parallel. As shown in the drawing, the arms and draw bar all lie in the same horizontal plane.

I claim:

1. A hitch for interconnecting a draft vehicle with the axle of a trailer, including a draw bar, separate means at each end of the draw bar for pivoting the same to the vehicle and to the axle of the trailer, a sleeve freely shiftable upon the draw bar, two arms, separate means for pivoting one end of each arm to the sleeve for swing movement relative to the axis of the sleeve, and separate means pivotally connecting the opposite end of an arm to the draft vehicle and the opposite end of the other arm to the trailer axle, both arms being at an angle to the draw bar.

2. A hitch for interconnecting a draft vehicle with the axle of a trailer, including a universal connection between one end of the draft bar and the vehicle, and a pivotal connection with the opposite end of the draft bar and the axle of the trailer, a sleeve freely shiftable upon the draft bar, an arm, means pivotally connecting one end of said arm to one end of the sleeve, and means pivotally connecting the opposite end of said arm to the vehicle, a second arm, a ball and socket connection with said sleeve and one end of said second arm, and means pivotally connecting the opposite end of said arm with the axle of the trailer, the first and second arms being at an angle to the draw bar.

WALTER E. ELLIS.

References Cited in the file of this patent

UNITED STATES PATENTS

| Number | Name | Date |
|---|---|---|
| 1,247,201 | Yoder | Nov. 20, 1917 |
| 1,325,867 | Stevenot | Dec. 23, 1919 |
| 1,471,346 | Moxey | Oct. 23, 1923 |
| 2,127,057 | Drake | Aug. 16, 1938 |
| 2,210,007 | Rodin | Aug. 6, 1940 |